United States Patent
Molino et al.

(10) Patent No.: US 9,470,331 B2
(45) Date of Patent: Oct. 18, 2016

(54) ELECTRICALLY CONTROLLED VALVE DEVICE FOR HOUSEHOLD EQUIPMENTS

(71) Applicant: ELBI International S.p.A., Turin (IT)

(72) Inventors: Giorgio Molino, Turin (IT); Paola Ravedati, Turin (IT); Maurizio Rendesi, Turin (IT)

(73) Assignee: ELBI INTERNATIONAL SPA, Turin (IT)

( * ) Notice: Subject to any disclaimer, the term of this patent is extended or adjusted under 35 U.S.C. 154(b) by 49 days.

(21) Appl. No.: 14/357,803

(22) PCT Filed: Nov. 14, 2012

(86) PCT No.: PCT/IB2012/002347
§ 371 (c)(1),
(2) Date: May 13, 2014

(87) PCT Pub. No.: WO2013/072739
PCT Pub. Date: May 23, 2013

(65) Prior Publication Data
US 2014/0312254 A1    Oct. 23, 2014

(30) Foreign Application Priority Data

Nov. 16, 2011  (IT) .............................. TO2011A1055

(51) Int. Cl.
*F16K 31/06*    (2006.01)

(52) U.S. Cl.
CPC ...... *F16K 31/0644* (2013.01); *Y10T 137/5987* (2015.04)

(58) Field of Classification Search
CPC .................... F16K 31/0644; Y10T 137/5987
See application file for complete search history.

(56) References Cited

U.S. PATENT DOCUMENTS

| 3,195,561 A | * | 7/1965 | Sovitzky | ............. | A47L 15/4217 |
| | | | | | 137/15.09 |
| 3,357,678 A | * | 12/1967 | Dyki | ....................... | F16K 27/00 |
| | | | | | 251/143 |

(Continued)

FOREIGN PATENT DOCUMENTS

DE         195 27 050         1/1997

OTHER PUBLICATIONS

International Search Report for International Application No. PCT/IB2012/002347 mailed Jan. 25, 2013 (2 pages).

*Primary Examiner* — Craig Schneider
*Assistant Examiner* — Kevin Barss
(74) *Attorney, Agent, or Firm* — Merchant & Gould P.C.

(57) ABSTRACT

A valve device (10) includes a hollow body (12) adapted to be passed through by a flow of fluid and having an inlet section (12*a*) and at least one outlet section (12*b*) to receive and dispense fluid. A joining element (14) connects to a fluid source, and connects at the inlet section (12*a*). A support bracket (16) is assembled to the inlet section (12*a*) to hold the joining element (14) connected to the hollow body (12), and is configured to be fastened to an external load-bearing structure. One electrically controlled valve (18) is arranged in the hollow body (12) between the inlet section (12*a*) and the outlet section (12*b*), and configured for selectively controlling the exit of the flow of fluid. The valve device (10) also includes a locking member (20) arranged astride the bracket (16) and the inlet section (12*a*), and tends to elastically tighten against the support bracket (16) and the inlet section (12*a*) from laterally opposite parts, to axially constrain the support bracket (16) and the inlet section (12*a*) one to the other.

9 Claims, 4 Drawing Sheets

(56) References Cited

U.S. PATENT DOCUMENTS

| | | | | |
|---|---|---|---|---|
| 3,971,540 A * | 7/1976 | Johnson | A47L 15/4217 | 134/186 |
| 4,149,554 A * | 4/1979 | Pease | D06F 39/088 | 137/343 |
| 4,266,567 A * | 5/1981 | Pease | A47L 15/4217 | 137/343 |
| 4,363,337 A * | 12/1982 | Pease | A47L 15/4217 | 137/343 |
| 4,437,488 A * | 3/1984 | Taggart | B05C 5/0225 | 137/334 |
| 5,964,447 A * | 10/1999 | DuHack | F16K 31/404 | 137/143 |
| 6,422,258 B1 * | 7/2002 | DuHack | F16K 27/029 | 137/15.09 |
| 2006/0113431 A1 | 6/2006 | Honermann | | |

* cited by examiner

ELECTRICALLY CONTROLLED VALVE DEVICE FOR HOUSEHOLD EQUIPMENTS

This application is a National Stage Application of PCT/IB2012/002347, filed 14 Nov. 2012, which claims benefit of Serial No. TO2011A001055, filed 16 Nov. 2011 in Italy and which applications are incorporated herein by reference. To the extent appropriate, a claim of priority is made to each of the above disclosed applications.

TECHNICAL FIELD

The present invention relates to an electrically controlled valve device, in particular for household appliances.

BACKGROUND ART

It is generally known to use electrically controlled valve devices for controlled and metered dispensation of a flow of fluid, e.g. water.

In particular, these valve devices find application in the field of electric appliances, e.g. in washing machines such as laundry washing machines or dishwashers for household or professional use. Nevertheless, such valve devices may also be used in other applications wherein generic control of an incoming flow of fluid is required, e.g. beverage dispensers, medical apparatuses, etc.

Valve devices are known in the art which include:

a hollow body adapted to be passed through by a flow of fluid and having an inlet section intended to receive the incoming flow of fluid and at least one outlet section intended to dispense the flow of fluid;

a joining element arranged for being connected to a fluid source, and sealingly connected to the inlet section;

a support bracket assembled to the inlet section so as to hold the joining element connected to the hollow body, and intended to be fastened to an external load-bearing structure; and an electrically controlled valve arranged in the hollow body between the inlet section and the outlet section, and configured for selectively controlling the exit of the flow of fluid.

In this type of valve devices, the support bracket is generally screwed to the inlet section, overlapping the periphery of the pipe union. In this manner, the pipe union stays firmly secured between the support bracket and the inlet section.

However, this structure has a few drawbacks.

A drawback is that the step of screwing the support bracket to the inlet section is difficult and time-consuming. Moreover, the valve device is difficult to remove because it is necessary to unscrew the support bracket from the inlet section.

BRIEF DESCRIPTION OF THE INVENTION

It is an object of the present invention to provide an improved valve device.

It is another object of the present invention to provide a valve device that can be assembled in a simpler manner between the hollow body and the support bracket, thus leading to reduced production costs and times.

It is to be understood that the appended claims are an integral part of the technical teachings included in the description of the present invention.

BRIEF DESCRIPTION OF THE DRAWINGS

Further features and advantages of the present invention will become apparent from the following detailed description, which is only provided by way of explanatory and non-limiting example with reference to the annexed drawings, wherein.

DETAILED DESCRIPTION OF THE INVENTION

Figure 1:
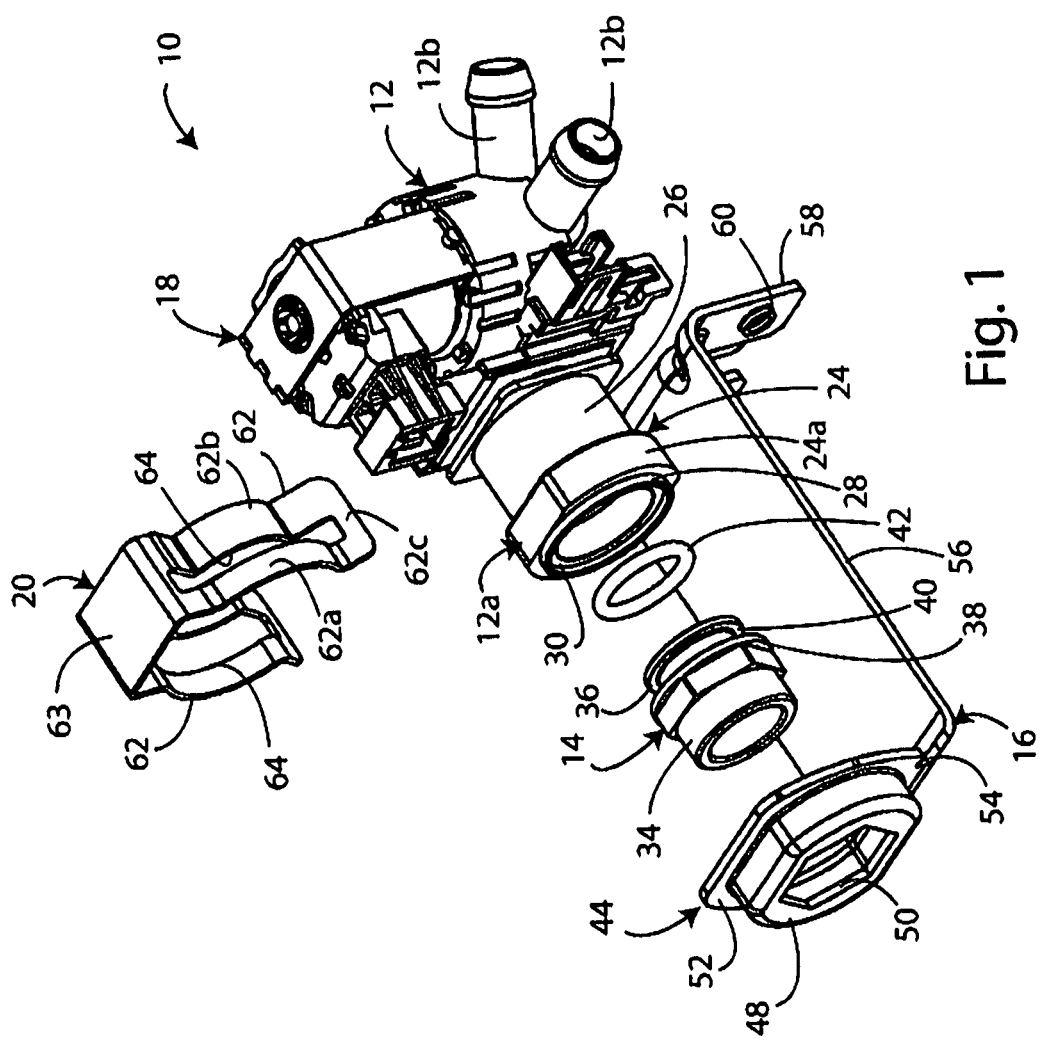
FIG. 1 is a partially exploded perspective view of a valve device according to an exemplifying embodiment of the present invention.
Figure 2:
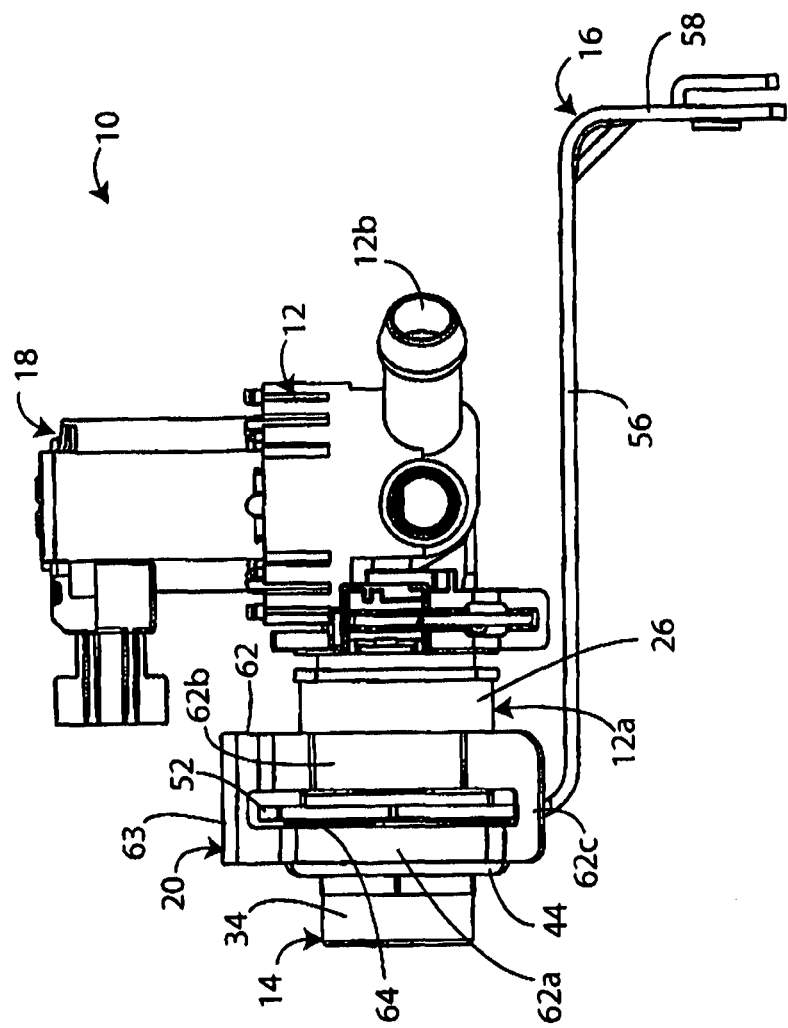
FIG. 2 is a side elevation view of the valve device shown in FIG. 1.

With particular reference to FIG. 1, reference numeral 10 designates as a whole a valve device according to an exemplifying embodiment of the present invention. Valve device 10 is especially adapted to be used in household appliances, e.g. washing machines such as laundry washing machines and dishwashers for household or professional use. Nevertheless, valve device 10 may also be used in other applications wherein generic control of an incoming flow of fluid is required, e.g. beverage dispensers, medical apparatuses, etc.

Valve device 10 comprises a hollow body 12 adapted to be passed through by a flow of fluid (e.g. water) and having an inlet section 12a intended to receive the incoming flow of fluid and at least one outlet section 12b intended to dispense the flow of fluid.

In the illustrated embodiment, hollow body 12 has a pair of outlet sections 12b; other variants, however, may be equipped with only one outlet section 12b or with a different number of outlet sections 12b.

Valve device 10 also comprises a joining element, or pipe union, 14 arranged for being connected to a fluid source, e.g. to the water distribution mains, and connected to hollow body 12 at inlet section 12a. The connection between joining element 14 and inlet section 12a is a fluid-sealed one.

Preferably, joining element 14 is inserted into inlet section 12a; however, in other variant embodiments it is conceivable to provide the connection between joining element 14 and hollow body 12 by inserting inlet section 12a into joining element 14.

Valve device 10 further comprises a support bracket 16 assembled to inlet section 12a so as to hold joining element 14 connected to hollow body 12. In the illustrated embodiment, support bracket 16 holds joining element 14 in connection with inlet section 12a, preferably inside of it. Support bracket 16 is adapted to fasten hollow body 12 to an external load-bearing structure, e.g. the inner wall of a household appliance such as a washing machine (a laundry washing machine or a dishwasher).

Valve device 10 further comprises an electrically controlled valve 18 arranged in hollow body 12 between inlet section 12a and outlet sections 12b, and configured for selectively controlling the exit of the flow of fluid. In the illustrated embodiment, valve 18 is a solenoid valve of a per se known type, e.g. a three-way solenoid valve; however, in other variants valve 18 may be an electrovalve of any known type.

Valve device 10 further comprises a locking member 20 arranged astride support bracket 26 and inlet section 12a, and tending to elastically tighten against them on laterally opposite parts, so as to axially constrain them one to the other. As will become apparent below, this measure makes it easier to join inlet section 12a and support bracket 16, without requiring the use of screws or other mechanical connection elements that would be difficult, expensive and time-consuming to install.

Optionally, valve device 10 also includes a flow-rate measuring device or flow meter 22 (FIG. 4) arranged in inlet section 12a and configured for providing electric signals which are indicative of the flow rate going through it.

Preferably, hollow body 12 is made of a moulded plastic material, e.g. obtained by injection moulding. More preferably, hollow body 12 is made as one piece.

In the illustrated embodiment, inlet section 12a has a substantially tubular shape. Inlet section 12a preferably defines a distal portion or head 24 from which a proximal portion or neck 26 extends. For example, head 24 is laterally wider than neck 26, and preferably has arched external enlargements 24a (FIG. 1) extending from laterally opposite parts. In the illustrated embodiment, arched enlargements 24a define arcs of circumference.

Figure 4:
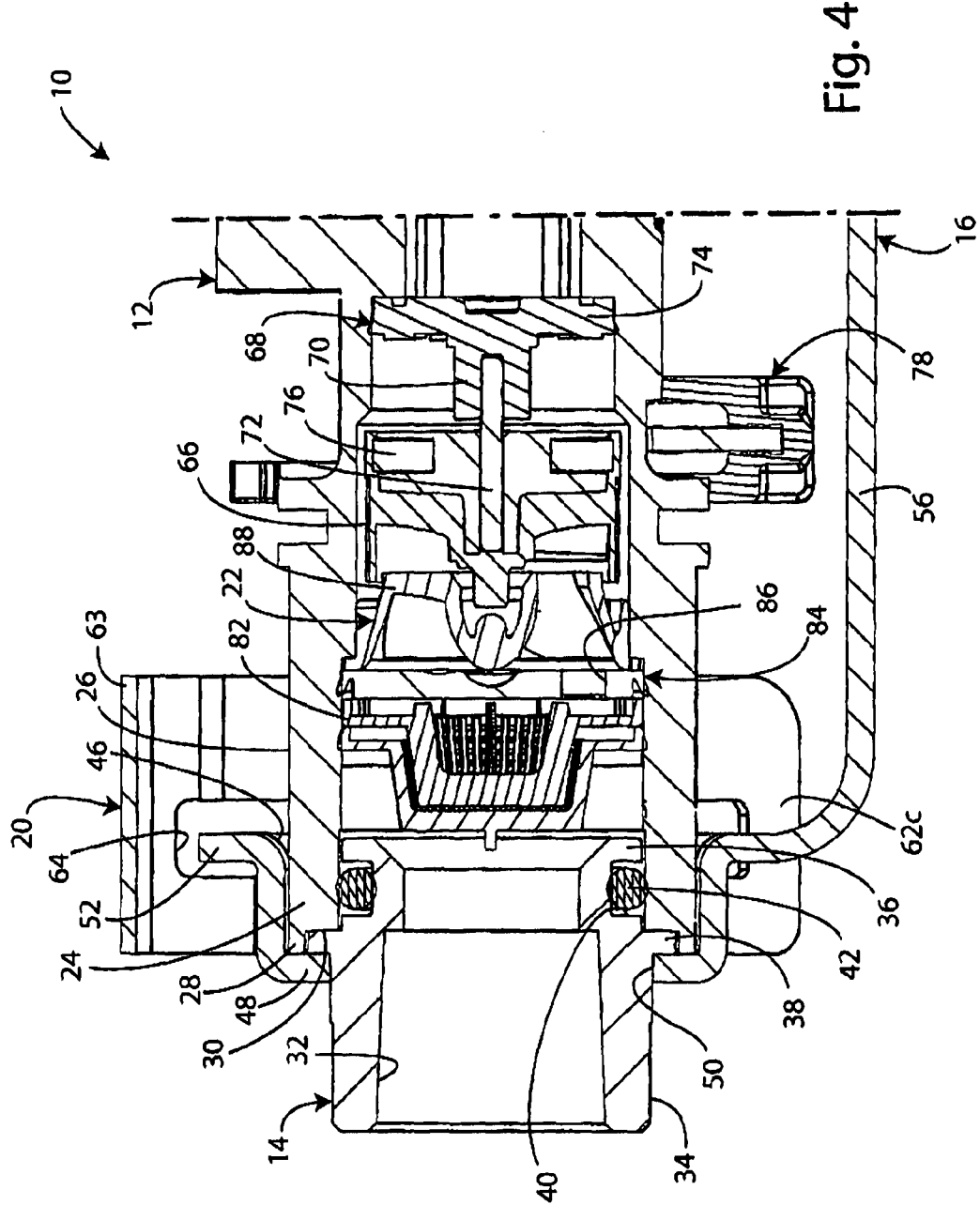
FIG. 4 is a partial longitudinal sectional view of the valve device shown in the preceding Figures.

With particular reference to FIGS. 1 and 4, head 24 ends with an axially protruding peripheral edge 26 located in a radially external position. In a radially more internal position relative to peripheral edge 28, head 24 defines an annular shoulder surface 30.

In the illustrated embodiment, inlet joint 14 has a substantially tubular shape. Preferably, inlet joint 14 is made of a metallic material, e.g. brass. Advantageously, inlet joint 14 is made as one piece.

With particular reference to FIG. 4, inlet joint 14 has an internal thread 32 adapted to be coupled to a complementary thread of an external connection element, e.g. a threaded bushing of a pipe connected to the water distribution mains.

Inlet joint 14 preferably has a distal portion 34 and a proximal portion 36, between which a perimetric extension 38, radially enlarged with respect to proximal portion 34, is axially arranged. In the illustrated embodiment, the perimetric extension substantially comprises a ring 38 extending along the whole periphery of inlet joint 12a.

Proximal portion 36 preferably has a peripheral groove 40, which is radially recessed inwards and houses an annular sealing gasket 42.

When assembling inlet joint 14 to hollow body 12, inlet joint 14 is inserted into inlet section 12a. In this condition, proximal portion 36 is completely inserted in inlet section 12a and gasket 42 ensures a radial seal against the inner walls of inlet section 12a. Perimetric extension 38 rests against shoulder surface 30, and distal portion 36 lies outside inlet section 12a.

In the illustrated embodiment, support bracket 16 is made of a metallic material, e.g. stainless steel.

Preferably, support bracket 16 has a hollow portion 44 which axially receives inlet section 12a, e.g. at head 24, and which is axially crossed by joining element 14, e.g. by distal portion 34. Advantageously, hollow portion 44 has a shape which is substantially complementary to the one of head 24.

In the illustrated embodiment, hollow portion 44 comprises a mouth 46 through which inlet section 12a is inserted (e.g. head 24), and an annular bottom 48 that includes an axial passage 50 through which joining element 14 (e.g. its distal portion 34) protrudes axially outwards.

Preferably, support bracket 16, e.g. at hollow portion 44, has a transversally protruding area 52. More preferably, protruding area 52 extends transversally on opposite sides of support bracket 16, e.g. from hollow portion 44. In the illustrated embodiment, said protruding area consists of a flange 52 transversally facing outwards, e.g. obtained along the periphery of hollow portion 44. Preferably, protruding area or flange 52 extends radially outwards at mouth 46. Preferably, protruding area or flange 52 has a pair of side recesses 54 on opposite sides.

In the illustrated embodiment, support bracket 16 includes a connection tongue 56 that protrudes from hollow portion 44.

Preferably, connection tongue 56 extends from a section of protruding area or flange 52, e.g. from the section where side recesses 54 are obtained, and is bent with respect to hollow portion 44. For example, connection tongue 56 is bent by 90° with respect to hollow portion 44. By way of example, connection tongue 56 has a free end 58 fitted with connection means, such as holes 60 adapted to receive assembling screws, so as to allow fastening support bracket 16 to the household appliance. Preferably, free end is bent by another 90° with respect to the rest of connection tongue 56.

When assembling support bracket 16, annular bottom 48 defines an abutment surface against which perimetric extension 38 and peripheral, edge 28 are in axial contact. Perimetric extension 38 is axially interposed between annular bottom 48 and annular shoulder surface 30.

Preferably, locking member 20 is made of a metallic material. More preferably, it is made as one piece, e.g. from a strip or thin layer worked by bending.

In the illustrated embodiment, locking member 20 comprises a pair of side jaws 62 which partially surround support bracket 26 and inlet section 12a, and which tend to elastically tighten against the latter.

In the illustrated embodiment, locking member 20 comprises a transversal section 63 which connects side jaws 62 while keeping them appropriately spaced. Advantageously, side jaws 62 and transversal section 64 define a substantially C-shaped profile.

Preferably, one of side jaws 62 tends to tighten at least against support bracket 26, while the other jaw tends to tighten at least against inlet section 12a.

In the illustrated embodiment, each one of side jaws 62 tends to simultaneously tighten against support bracket 26, preferably against its hollow portion 44, and against inlet section 12a, preferably against its proximal section 26.

Preferably, at least one of side jaws 52 has a longitudinal slot 64 which is passed through by transversally protruding area 52 of support bracket 12a. In the illustrated embodiment, the protruding area is a part of flange 52. More preferably, both side jaws 62 have longitudinal slots 64 which are passed through by protruding area or flange portion 52.

Preferably, longitudinal slot 66 divides the respective jaw into a first and a second intermediate branches 62a, 62b arranged on opposite sides with respect to longitudinal slot 64.

In the illustrated embodiment, preferably in each jaw 62, first intermediate branch 62a tends to elastically tighten against bracket 26 (e.g. against it hollow portion 44), while second intermediate branch 62b tends to elastically tighten against inlet section 12a (e.g. against its proximal portion 26).

Each one of branches 62a, 62b, preferably in each jaw 62, is preferably so shaped as to match a portion of bracket 26 (e.g. of its hollow portion 44) and, respectively, a portion of inlet section 12a (e.g. of its proximal portion 26).

In the illustrated embodiment, branches 62a and 62b are arched; preferably, the bending radius of the first branch 62 coincides with the bending radius of the side surface of hollow portion 44 and is greater than the bending radius of second branch 62b, which coincides with the bending radius of the side surface of proximal portion 26.

In the illustrated embodiment, preferably in each jaw 62, the first and second branches 62a, 62b close to join up into a common terminal end 62c. Preferably, terminal ends 62c of jaws 62 are bent relative to respective branches 62a, 62b in outward diverging directions.

In the illustrated embodiment, each one of terminal ends 62 is housed in and hooked to a respective side recess 54.

In further variant embodiments, the longitudinal slots may be notches that completely separate the first and second branches throughout their extension; in this case, the first and second branches will form, for each jaw 62, a pair of appendices that bifurcate from the transversal section 63 without then joining up again.

During the assembly process, locking member 20 is pushed up towards hollow body 12 and support bracket 16. More in detail, side jaws 62, which are elastically flexure-preloaded, are pushed over hollow body 12 and support bracket 16 and open out by interference, thus abutting with their terminal ends 62c against diverging side sections 52a (FIG. 3) of flange 52. Finally, when terminal ends 72 go into side recesses 54, branches 62a, 62b are in a position that matches the side surface of hollow portion 44 of bracket 16 and, respectively, of proximal portion 26 of inlet section 12a, thus exerting a lateral locking action.

In addition, locking member 20 tends to prevent any axial sliding between inlet section 12a and support bracket 16. In fact, if inlet section 12a is subjected to stress tending to push it away from support bracket 16 and locking member 20 tends to be dragged along in the same direction, first branch 62a will abut against flange 52, thus countering such a movement. Vice versa, if support bracket is subjected to stress tending to push it away from inlet section 12a and the locking member tends to be dragged along in the same direction, second branch 62b will abut against enlarged distal head 24 of inlet section 12a, so that also this kind of movement is prevented.

In the illustrated embodiment, flow measuring device 22 is a turbine-type volumetric one.

With reference to FIG. 4, flow measuring device 22 comprises a blade impeller 66 rotatably assembled in inlet section 12a. Impeller 66 is preferably rotatably supported by a support base 68 secured in inlet section 12a, through which the flow of fluid can pass. Advantageously, support base 68 includes a central portion 70 from which a pin 72 protrudes, around which blade impeller 66 can rotate. Preferably, support base 68 further comprises a plurality of radial arms or spokes 74 that come together into central portion 70, thereby supporting pin 72. For example, pin 72 is jointly inserted into the central portion 70.

In the illustrated embodiment, at least one magnetic element 76, made of permanent magnetic material, is assembled in a per se known manner to the periphery of blade impeller 66.

Preferably, flow measuring device 22 comprises a detector 78, e.g. a so-called reed relay, which is adapted to change state whenever magnetic element 76 passes near the latter. Through connection members 80, detector 78 can be connected to an external control unit. When in use, the frequency of the signals supplied by detector 78 is indicative of the revolution speed of impeller 66, and hence of the flow rate of the fluid passing through flow measuring device 22 arranged in inlet section 12a.

In the illustrated embodiment, flow measuring device further comprises a filtering device 82 located immediately downstream of joining element 14, a flow uniforming device 84, e.g. including a disc equipped with apertures or holes 86, and a flow diverting or directing device 88, arranged downstream of flow unifying device 84 and adapted to direct the flow of fluid towards blade impeller 66.

Filtering device 82, flow unifying device 84 and the diverting device 88 are elements which, taken individually, are per se known in the industry; therefore, they will not be further described.

Figure 3:
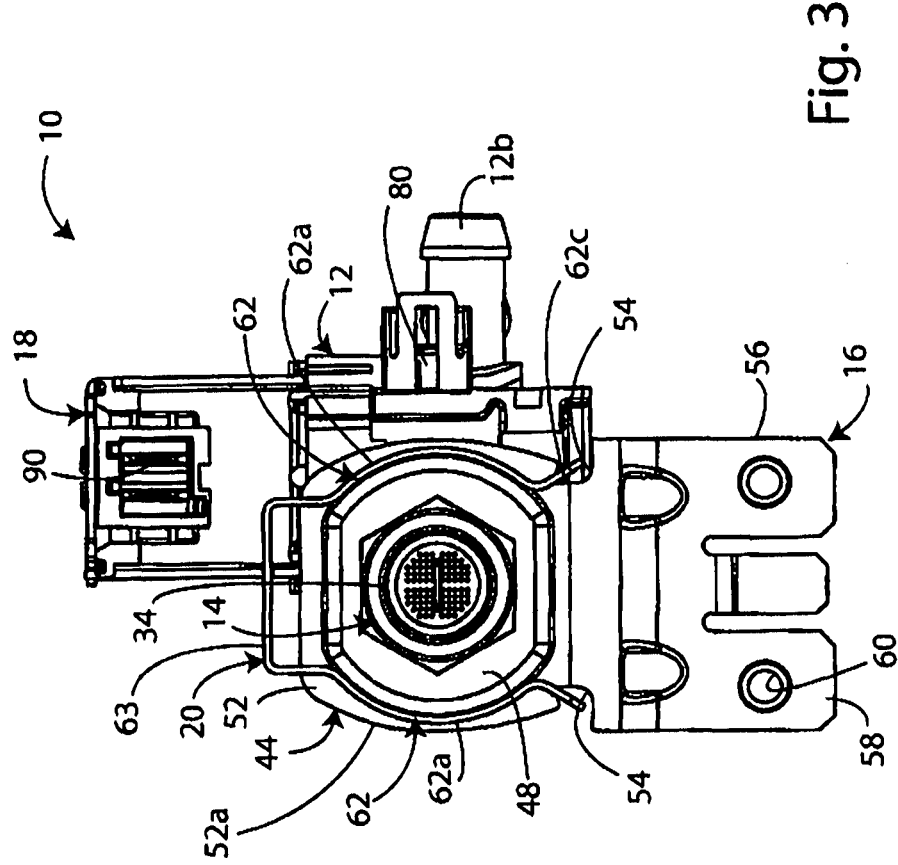
FIG. 3 is a front elevation view of the valve device shown in the preceding Figures.

Electrically-controlled valve 18 is arranged in hollow body 12, downstream of inlet section 12a and upstream of outlet sections 12b. Preferably, electrically controlled valve 18 is a solenoid electrovalve of a type per se known in the industry, and therefore will not be further described. The electrically controlled valve may be connected to an external control unit through reed connectors 90 (FIG. 3). In other variant embodiments, valve device 10 may comprise, instead of a single valve 18, a plurality of electrically controlled valves arranged downstream of inlet section 12a.

Naturally, without prejudice to the principle of the invention, the embodiments and constructional details may be widely varied with respect to what has been described and illustrated, purely by way of a non-limiting example, without thereby departing from the scope of the invention as defined in the accompanying claims.

The invention claimed is:

1. Electrically controlled valve device comprising:
    a hollow body adapted to be passed through by a flow of fluid and having an inlet section configured to receive said flow of fluid and at least one outlet section configured to dispense said flow of fluid;
        a joining element arranged for being connected to a fluid source, and connected to the hollow body at the inlet section;
        a support bracket assembled to said inlet section so as to hold said joining element connected to said hollow body, and configured to be fastened to an external load-bearing structure; and
        at least one electrically controlled valve arranged in said hollow body between said inlet section and said at least one outlet section, and configured for selectively controlling exit of said flow of fluid;
        a locking member arranged astride said bracket and said inlet section, and configured to elastically tighten against said support bracket and said inlet section from laterally opposite parts, so as to axially constrain said support bracket with said inlet section;
        wherein the locking member has a pair of side jaws at least partially surrounding said support bracket and said inlet section, said pair of side jaws being configured to elastically tighten against said support bracket and said inlet section.

2. The device according to claim 1, wherein each one of the side jaws simultaneously tightens against said support bracket and said inlet section.

3. The device according to claim 2, wherein said support bracket comprises an area transversally protruding with respect to the inlet section, and at least one of the side jaws has a slot or a longitudinal notch adapted to be passed through by said protruding area.

4. The device according to claim 3, wherein said slot or notch divides the respective side jaw into a first branch and a second branch located on opposite sides with respect to said slot or notch.

5. The device according to claim 4, wherein said first branch and said second branch elastically tighten against said bracket and, respectively, against said inlet section.

6. The device according to claim 4, wherein said first branch and said second branch join up into a common terminal end.

7. The device according to claim 6, wherein the terminal ends are housed in and hooked to respective side recesses obtained on opposite sides of said protruding area.

8. The device according to claim 4, wherein the inlet section comprises an enlarged distal portion and a narrowed proximal portion; said second branch configured to elastically tighten against the side surface of said proximal portion.

9. The device according to claim 1, wherein said joining element has a groove in which an annular sealing gasket is assembled, the annular sealing gasket ensuring radial sealing against inner walls of said inlet section.

\* \* \* \* \*